(12) United States Patent
Horiuchi et al.

(10) Patent No.: US 10,793,095 B2
(45) Date of Patent: Oct. 6, 2020

(54) STRUCTURE FOR MOUNTING RADAR

(71) Applicant: MITSUBISHI JIDOSHA KOGYO KABUSHIKI KAISHA, Tokyo (JP)

(72) Inventors: Masanao Horiuchi, Tokyo (JP); Shingo Kawano, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 241 days.

(21) Appl. No.: 15/900,259

(22) Filed: Feb. 20, 2018

(65) Prior Publication Data
US 2018/0236958 A1  Aug. 23, 2018

(30) Foreign Application Priority Data

Feb. 21, 2017  (JP) ................. 2017-029985

(51) Int. Cl.
*B60R 21/00* (2006.01)
*B60R 19/02* (2006.01)
*B62D 25/08* (2006.01)
*B60Q 9/00* (2006.01)
*B60R 11/00* (2006.01)
*G01S 13/04* (2006.01)
*G01S 13/931* (2020.01)

(52) U.S. Cl.
CPC ............ *B60R 21/00* (2013.01); *B60Q 9/008* (2013.01); *B60R 19/02* (2013.01); *B62D 25/082* (2013.01); *B60R 2011/004* (2013.01); *B62D 25/084* (2013.01); *G01S 13/04* (2013.01); *G01S 13/931* (2013.01)

(58) Field of Classification Search
CPC ........ B62D 25/084; G01S 2013/93275; B60R 19/483

USPC ............ 296/187.03, 187.09, 1.04, 193.1, 30
See application file for complete search history.

(56) References Cited

U.S. PATENT DOCUMENTS

| | | | |
|---|---|---|---|
| 5,326,133 A * | 7/1994 | Breed ................. | B60R 19/483 180/274 |
| 9,673,517 B2 * | 6/2017 | Tran ................... | H01Q 1/1207 |
| 9,682,728 B2 | 6/2017 | Taneda | |
| 10,493,934 B2 * | 12/2019 | Fernandez .......... | B60R 19/023 |

(Continued)

FOREIGN PATENT DOCUMENTS

| CN | 1321833 C | 7/2004 |
|---|---|---|
| CN | 101293504 A | 4/2008 |

(Continued)

OTHER PUBLICATIONS

Chinese Office Action for Application No. 201810011154.9, dated Aug. 4, 2020 with English language translation.

*Primary Examiner* — Jason S Morrow
*Assistant Examiner* — E Turner Hicks
(74) *Attorney, Agent, or Firm* — Birch, Stewart, Kolasch & Birch, LLP

(57) ABSTRACT

In a structure for mounting a radar, a cross linking member vertically connects two width-across members aligned in a front-to-rear direction of a vehicle. A fixing member is fixed to the cross linking member. The fixing member includes a fixing part fixed to the cross linking member, a supporting part that supports a radar device, a deformable part. The deformable part has a shape connecting the fixing part and the supporting part and bends and deforms to absorb shock when an external force is input into the radar device.

10 Claims, 8 Drawing Sheets

(56) References Cited

U.S. PATENT DOCUMENTS

| | | | |
|---|---|---|---|
| 2005/0062641 A1* | 3/2005 | Kakishita | G01S 7/03 |
| | | | 342/70 |
| 2007/0063133 A1 | 3/2007 | Furuya | |
| 2008/0265622 A1 | 10/2008 | Benkler et al. | |
| 2014/0111370 A1 | 4/2014 | Aleem et al. | |
| 2014/0354465 A1 | 12/2014 | Lee et al. | |
| 2015/0318608 A1 | 11/2015 | Tran et al. | |
| 2016/0137230 A1* | 5/2016 | Taneda | B62D 25/085 |
| | | | 296/193.09 |
| 2017/0088077 A1* | 3/2017 | Kumai | B60R 19/483 |

FOREIGN PATENT DOCUMENTS

| | | |
|---|---|---|
| CN | 104175965 A | 12/2014 |
| CN | 204415318 U | 6/2015 |
| CN | 105599813 A | 5/2016 |
| CN | 205202930 U | 5/2016 |
| DE | 102013221091 A1 | 4/2014 |
| DE | 102015119269 A1 | 5/2016 |
| JP | 2009-287950 A | 12/2009 |
| JP | 2015-63196 A | 5/2016 |

* cited by examiner

Rear view

Oblique perspective view

Top view

Side view

Top view

Front view

Side view

STRUCTURE FOR MOUNTING RADAR

CROSS-REFERENCE TO THE RELATED APPLICATION

This application incorporates by references the subject matter of Application No. 2017-029985 filed in Japan on Feb. 21, 2017 on which a priority claim is based under 35 U.S.C. § 119(a).

FIELD

The present invention relates to a structure for mounting a radar on a vehicle.

BACKGROUND

There has been developed a technique that arranges a radar device on a front or rear portion of a vehicle to rapidly detect the presence of an article or a pedestrian around the vehicle and thereby draw the driver's attention or activate the automatic brake. A radar device to detect an article in the front direction of the vehicle is usually arranged inside the bumper facer. For example, the detectability of the radar device is ensured by forming the radar device of a material having permeability to electromagnetic waves and shaping the surface portion of the bumper corresponding to the range of passing the electromagnetic wave emitted from the radar device into a smooth flat surface. It has been also known that the radar device is disposed inside the front grill disposed on the front end of the vehicle.

It is preferable that the radar device is disposed as close to the bumper facer as possible to enhance the detectability for an object by the radar device. Namely, the partial area of the bumper facer within the range of passing irradiated with the electromagnetic wave is designed to be as small as possible to reduce the restriction on shape and shape of the bumper facer. Meanwhile, since clearances are set on the front and rear end of the vehicle to endure a collision at the front and rear ends of the vehicle, the vehicle may sometimes have no vehicle body structure to mount the radar device in the vicinity of the bumper facer. As a solution to the above, a structure has been proposed which suspends a bracket between two width-across member disposed inside the bumper facer and mounts the radar device on the bracket (e.g., JP-A 2009-287950).

However, an external force caused from a collision at the front or rear end may be input into the radar device. If the bracket of the radar device is deformed by the external force, there is a possibility that the deformation damages an on-board device (e.g., the radiator or the oil cooler) disposed in the vicinity of the bracket. In contrast, if the deformation is suppressed by increasing the stiffness of the bracket, it is estimated that the collision load would not be adequately absorbed. As the above, a traditional radar device have had a difficulty in adopting a mounting structure capable of achieving both shock absorbability and detectability.

SUMMARY

With the foregoing problem in view, one of the object of the present embodiment is to provide a structure for mounting a radar device capable of achieving both shock absorbability and detectability. In addition to the above objects, advantages derived from the structures to be detailed in the following "DESCRIPTION OF EMBODIMENTS" but traditional techniques have not achieved can be regarded as other objects of the present embodiment.

The structure for mounting a radar disclosed herein includes a cross linking member that vertically connects two width-across members aligned in a front-to-rear direction of a vehicle. The structure further includes: a fixing member including a fixing part fixed to the cross linking member; a supporting part that supports a radar device, and a deformable part that has a shape connecting the fixing part and the supporting part and that bends and deforms to absorb shock when an external force is input into the radar device.

The configuration in which the radar device is fixed to the cross linking member by the fixing member supporting the radar device makes the radar device possible to come close to the bumper, so that the detectability of the radar can conceivably be enhanced. Providing the deformable part to the fixing member can conceivably enhance the capability of absorbing shock and can consequently enhance the protectablity of the cross linking member against the impact load.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

1. Configuration

Figure 1:
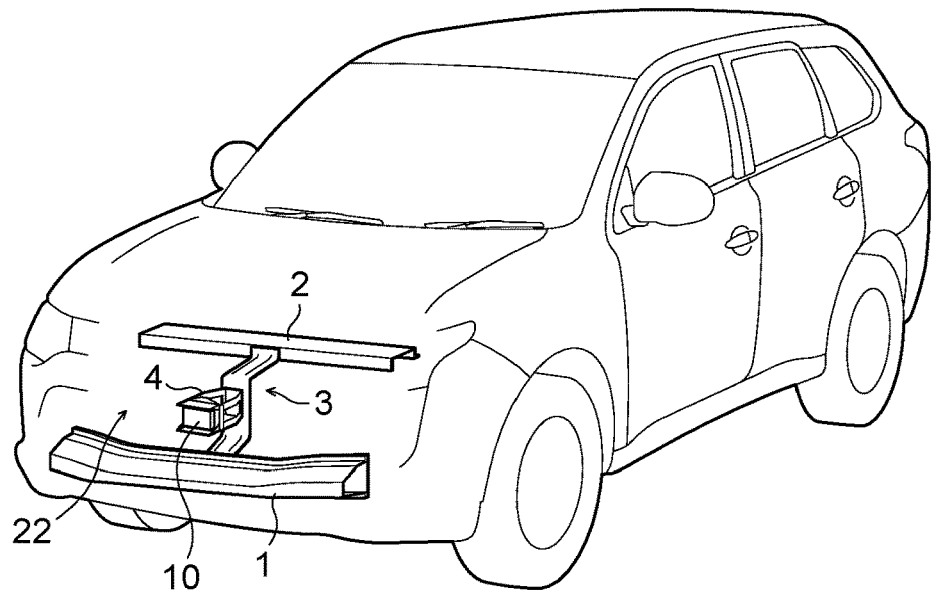
FIG. 1 is a perspective view of a vehicle adopting a structure for mounting a radar according to an embodiment.
Figure 2:
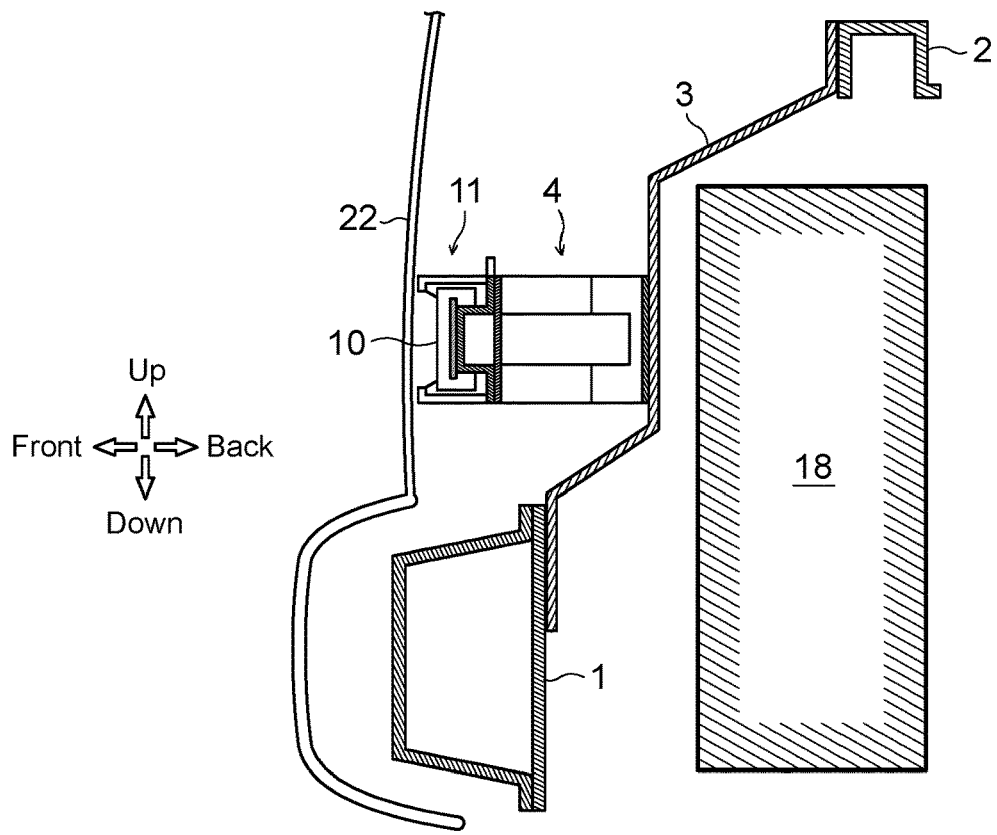
FIG. 2 is a sectional view of a structure for mounting a radar.

As illustrated in perspective in FIG. 1, a structure for mounting a radar according to an embodiment is applied inside the bumper facer 22 disposed on the front end of the vehicle. On the front end of the vehicle, a bumper beam 1 and the upper bar 2 are extend in the vehicle-width direction. As illustrated in FIG. 2, the bumper beam 1 is a structural member (width-across member) disposed inside the bumper facer 22 and is fixed to a side member or the cross member. If a cross member is disposed in the vicinity of the front end of the vehicle, the bumper beam 1 may be read as the cross member.

As illustrated in FIG. 2, a radar device 10 is disposed inside of the bumper facer 22. The bumper facer 22 is a resin molded product having permeability to electromagnetic waves (e.g., microwave or millimeter wave) emitted from the radar device 10.

An upper bar 2 is arranged above the bumper beam 1. The upper bar 2 is a width-across member that supports the top sides of a heat exchanger 18, such as an oil cooler or a radiator, and also supports the front end of the engine hood. The top side of a headlamp disposed on the front end of the vehicle is also supported by the upper bar 2. The upper bar 2 of the present embodiment is arranged slightly rearwards (backwards) to the upright of the bumper beam 1.

A cross linking member 3 is disposed between the bumper beam 1 and the upper bar 2 so as to vertically connect the bumper beam 1 and the upper bar 2. The cross linking member 3 is arranged approximately at the center of the vehicle width direction. As illustrated in FIG. 2, the cross linking member 3 has a vertical section in the form of stairs that declines towards the front end of the vehicle and having a step inclines downwards. This can avoid interface with the heat exchanger 18, which is arranged under the upper bar 2. The top-edge portion of the cross linking member 3 is fixed to the front face of the upper bar 2 and the bottom-edge portion thereof is fixed to the rear (back) face of the bumper beam 1.

Figure 3:
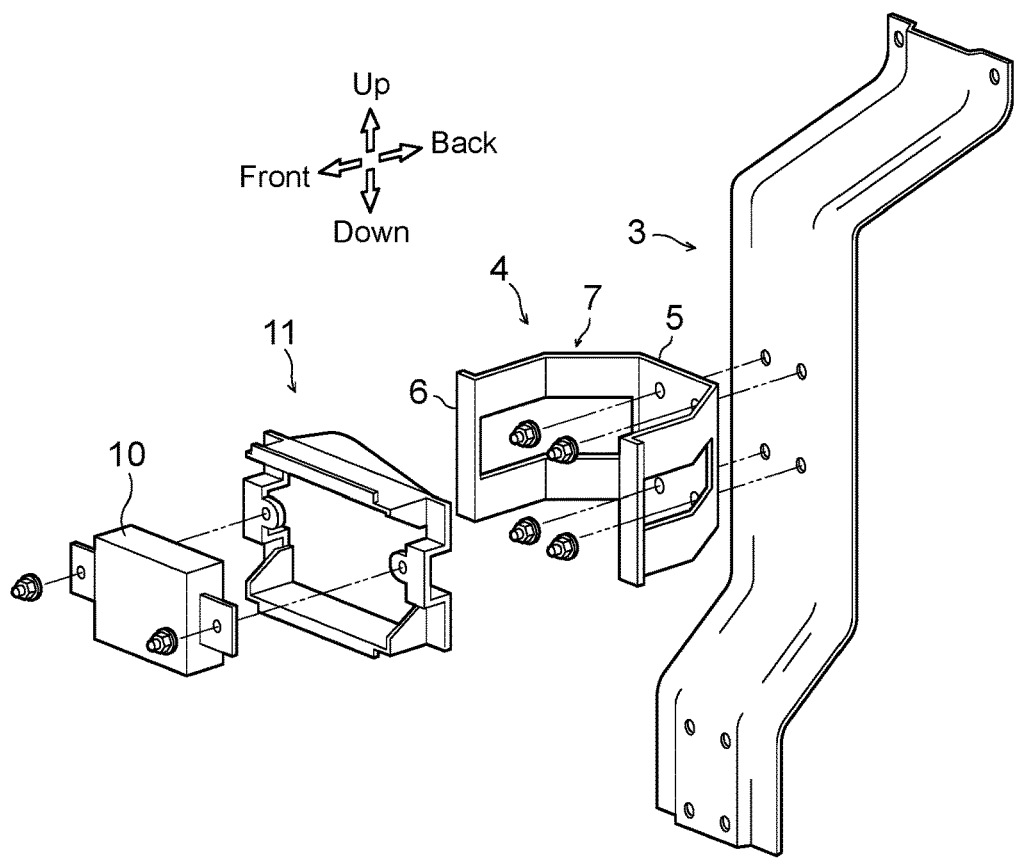
FIG. 3 is an exploded perspective view of a structure for mounting a radar.
Figure 4:
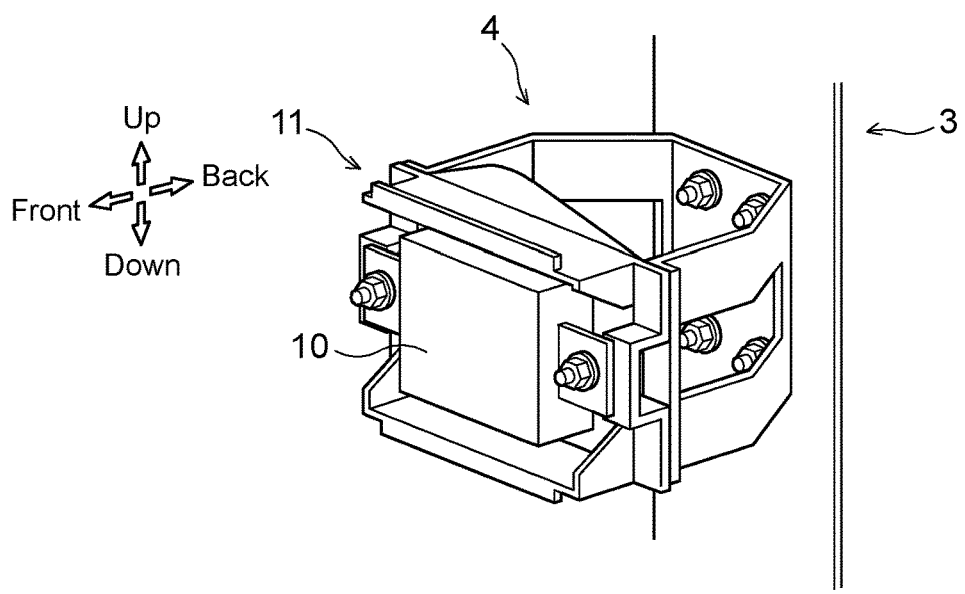
FIG. 4 is a perspective view of a structure for mounting a radar.

As illustrated in FIGS. 3 and 4, the radar device 10 is mounted to the front face of the cross linking member 3 via an EA bracket 4 and a protecting bracket 11. The EA bracket 4 is a bracket having a function for abating the impact by bending and deforming in the event of a collision at the front end of the vehicle. The word "EA" included in the EA bracket 4 is an abbreviation for "Energy Absorption". In contrast to the above, the protecting bracket 11 is a bracket having a function for protecting the radar device 10 from the impact caused by a collision at the front end of the vehicle. Combination use of the EA bracket 4 and the protecting bracket 11 enhances the protectability for the radar device 10 and abates the impact load to be transmitted to the cross linking member 3.

FIG. 3 illustrates an example in which the radar device 10 is fixed to the protecting bracket 11 with bolts; the protecting bracket 11 is fixed to the EA bracket 4 by welding; and the EA bracket 4 is fixed to the cross linking member 3 with bolts. Any fixing manner can be applied and fixing with bolts or by welding are examples. In view of easiness in maintenance, it is preferable that the EA bracket 4 is removable from the cross linking member 3, and the radar device 10 is removable from the protecting bracket 11. Under a state where these parts are assembled to become a product, the radar device 10 is fixed to the cross linking member 3, keeping a distance from the cross linking member 3 in the front-to-rear direction of the vehicle, as illustrated in FIG. 4. Hereinafter, description will now be made in relation to a structure for mounting a radar with the EA bracket 4 and the protecting bracket 11.

Figure 5:
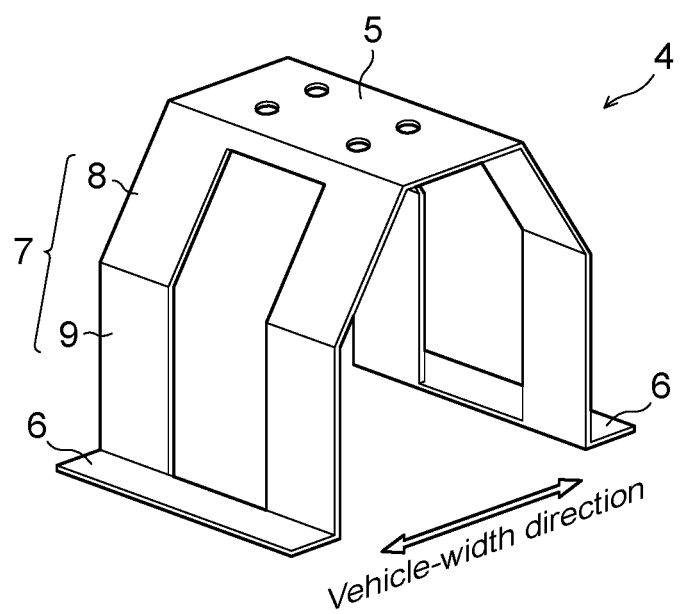
FIG. 5 is a perspective view of an EA bracket.

As illustrated in FIG. 5, the EA bracket 4 (fixing member) is provided with a fixing part 5, supporting parts 6, and deformable parts 7. The fixing part 5 is a portion to be fixed to the cross linking member 3. The fixing part 5 of the present embodiment is formed into a rectangular plate, and multiple holes through which fixing parts such as nuts and/or bolts are placed are formed on the fixing part 5. The EA bracket 4 is fixed to the cross linking member 3 by fixing the fixing part 5 to the cross linking member 3 under a state where the fixing part 5 is brought into face-to-face contact with the front face of the cross linking member 3. The EA bracket 4 is formed to have lower stiffness against external force in the front-to-rear direction of the vehicle than that of the cross linking member 3 (i.e., the EA bracket 4 is formed to more easily deform than the cross linking member 3 in the event of a collision on the front or rear end of the vehicle).

The supporting parts 6 are portions that support the radar device 10. Each supporting part 6 is shaped into a rectangular plate parallel to the fixing part 5. The position of each supporting part 6 is distant from the fixing part 5 along the front-to-rear direction of the vehicle. As illustrated in FIGS. 5 and 6A-6D, the supporting parts 6 of the present embodiment are provided at two positions not overlapping the fixing part 5 when the fixing part 5 is seen from the direction perpendicular to the plate face of the fixing part 5. The longer sides of each supporting part 6 are set to the same as the longer side of the fixing part 5. In contrast, the shorter sides of each supporting part 6 are disposed so as to lie on lines straightly extended from the shorter side of the respective fixing part 5 when the fixing part 5 is seen from the direction perpendicular to the plate face of the fixing part 5.

Each deformable part 7 is a portion having a shape that connects the fixing part 5 to the supporting part 6. The deformable parts 7 have functions for bending and deforming when external force caused by a collision on the front or rear end of the vehicle is input into the radar device 10 and for absorbing shock. Like the supporting parts 6, the deformable parts 7 are provided at two positions. One of the deformable parts 7 is in the form of a face that connects one side of the fixing part 5 to the edge side of the supporting part 6. The other deformable part 7 is in the form of a face that connects the other side of the fixing part 5 and the edge side of the supporting part 6. Each deformable part 7 of the present embodiment is provided with an inclined face 8 and a vertical face 9.

The inclined face 8 is a portion in the form of a flat face inclined from the fixing part 5 outwards in the vehicle-width direction (see FIG. 5). As illustrated in the top view FIG. 6C, the angle A formed by the inclined face 8 and the fixing part 5 is set to less than the 180° and more than 90°, and is preferably around 120°. The vertical face 9 is a portion formed into a flat face inclined with respect to the inclined face 8 and perpendicular to the supporting part 6. The angle B formed by the vertical face 9 and the inclined face 8 is (270-A)° and the angle C formed by the vertical face 9 and the supporting part 6 is 90°. Accordingly, each deformable part 7 bend in an oblique "L" shape at the boundary between the inclined face 8 and the vertical face 9.

Figure 6A:
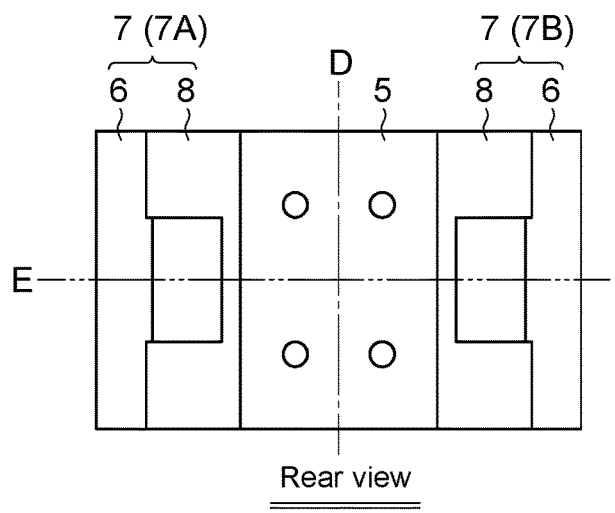
FIG. 6A is a rear view of an EA bracket.
Figure 6B:
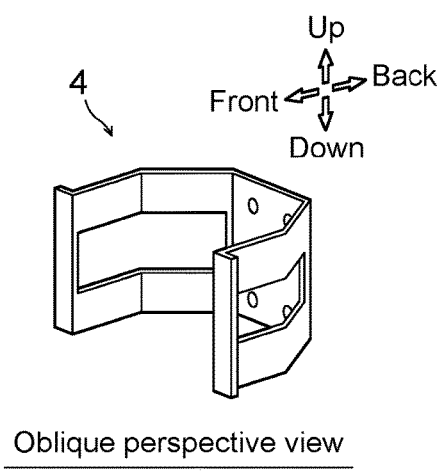
FIG. 6B is an oblique perspective view of an EA bracket.
Figure 6C:
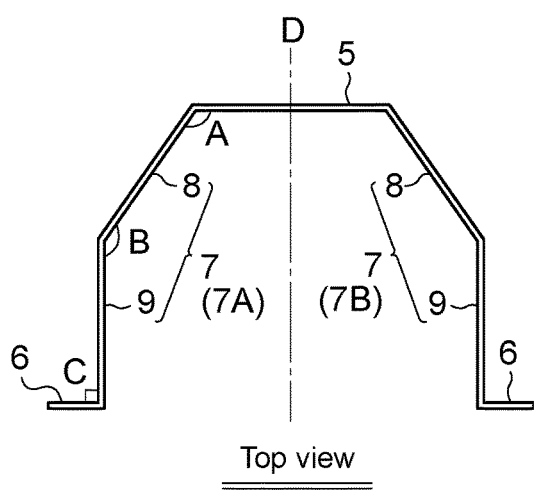
FIG. 6C is a top view of an EA bracket.

Since, as illustrated in the top view of FIG. 6C, the EA bracket 4 of the present embodiment includes oblique "L"-shaped deformable parts 7 at two positions, the entire EA bracket 4 can be regarded as having a U shape. In a different viewpoint, the shape of the top face of the EA bracket 4 is formed by cutting an octagon formed by four pairs of parallel opposite sides with a line perpendicular to an arbitrary pair of opposite sides and then attaching the supporting parts 6. As illustrated in an oblique perspective view FIG. 6B, the EA bracket 4 is arranged so as to spread towards the front when seen from the top, and is attached to the cross linking member 3 in such a posture that the fixing part 5 is positioned rearwards the supporting part 6.

Figure 6D:
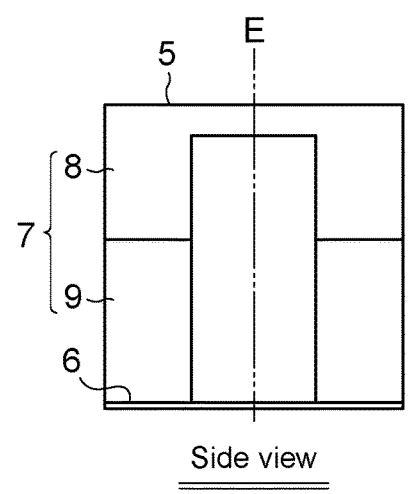
FIG. 6D is a side view of an EA bracket.

Here, one of the two deformable parts 7 connected to one of the supporting parts 6 is referred to as a first deformable portion 7A and the other one of the deformable parts 7 connected to the other supporting part 6 is referred to as a second deformable portion 7B. The first deformable portion 7A is formed into a shape being planar symmetric to the second deformable portion 7B. The one-dotted lines in the top view FIG. 6C and the rear view FIG. 6A represent positions of the imaginary symmetric plane D to the first deformable portion 7A and the second deformable portion 7B. Each of the first deformable portion 7A and the second deformable portion 7B is formed into a bifurcated shape (when seen from side) being planar symmetrical with respect to a horizontal imaginary orthogonal plane E to an imaginary symmetric plane D. The two-dotted lines in the top view FIG. 6C and the side view FIG. 6D represent the position of the imaginary orthogonal plane E. The bifurcated shape means that the deformable parts 7 are bifurcated on the ends of the supporting parts 6. The EA bracket 4 of the present invention includes the first deformable portion 7A and the second deformable portion 7B that are opposite to each other in the vehicle-width direction when seen from the top.

Figure 7:
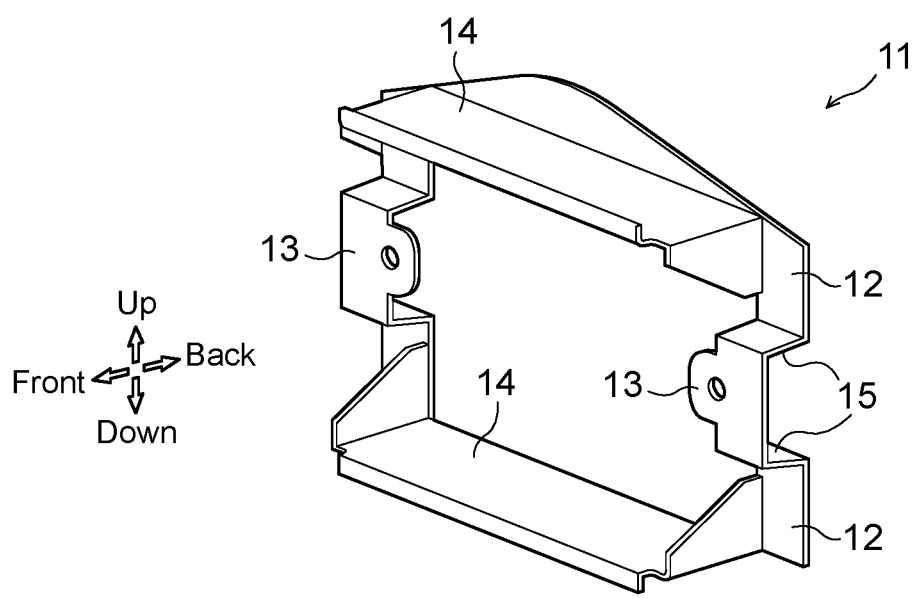
FIG. 7 is a perspective view of a protecting bracket.

As illustrated in FIG. 7, the protecting bracket 11 (protecting member) is provided with first mounting parts 12, second mounting parts 13, guard parts 14, and connecting parts 15. The first mounting parts 12 are portions to be mounted on the supporting parts 6 of the EA bracket 4, and the second mounting parts 13 are portions mounted thereon the radar device 10. The first mounting parts 12 of the present invention are each formed into a flat face and fixed to the supporting part 6 by welding, being in the state of face-to-face contact with the supporting part 6. The protecting bracket 11 includes four first mounting parts 12, and two first mounting parts 12 are provided to each supporting part 6 so as to be vertically distant from each other.

Each second mounting part 13 is formed into a flat plate parallel with the first mounting parts 12. The second mounting parts 13 are positioned distantly from the first mounting parts 12 in the front-to-rear direction of the vehicle. As illustrated in the front view FIG. 8B, each second mounting part 13 is provided at a position sandwiched by a pair of the first mounting parts 12 fixed to the same supporting part 6 by welding. The protecting bracket 11 is provided with two second mounting part 13, which are provided distantly from each other in the vehicle-width direction. On each of the second mounting part 13, a hole through which a fixing part, such as a nut and/or a bolt, are placed is formed. The protecting bracket 11 is fixed to the radar device 10 by fixing the second mounting part 13 being in a state of overlaying the installing bracket of the radar device 10.

The guard parts 14 are portions that protrude outwards in the front-to-rear direction of the vehicle further than the radar device 10 when the protecting bracket 11 is fixed to the radar device 10. As illustrated in the front view FIG. 8B, the guard parts 14 are disposed so as to horizontally extend along the top-edge face and the bottom-edge face of the radar device 10. The guard parts 14 of the present embodiment protrude towards the front of the vehicle and have the protruding edges formed to curve along the inner surface of the bumper facer 22. The guard parts 14 are disposed so as to connect the first mounting parts 12 on the left end and the right end. Of the two guard parts 14, the upper guard part 14 has a tip that curves upwards and the lower guard part 14 has a tip that curves downwards.

The connecting parts 15 are portions that connect the first mounting part 12 to the second mounting part 13 in the front-to-rear direction of the vehicle. The protecting bracket 11 is provided with four connecting parts 15, and two connecting parts 15 are provided to each second mounting part 13. As illustrated in the side view FIG. 8C, the position of the first mounting part 12 is staggered from that the second mounting part 13 in the front-to-rear direction of the vehicle. Connecting the second mounting part 13 with the first mounting parts 12 by the connecting parts 15 forms a crank-shaped supporting structure. In the present embodiment, the connecting parts 15 are provided at the upper end and the lower end of each second mounting part 13. Consequently, the stress transmission path from the second mounting part 13 to the first mounting parts 12 through the connecting parts 15 has a shape of a protrusion when seen from the side of the vehicle.

The protecting bracket 11 of the present embodiment is formed so as to have a higher stiffness against external force in the front-to-rear direction of the vehicle than that of the EA bracket 4. With this configuration, the EA bracket 4 more easily deforms than the protecting bracket 11 in the event of a collision on the front or rear end of the vehicle. The supporting structure formed of the first mounting parts 12, the second mounting part 13, and the connecting parts 15 less easily deforms than the EA bracket 4, but has a similar capability of shock absorbance. Accordingly, both the EA bracket 4 and the protecting bracket 11 have the capability of shock absorbance, so that the protectability for the cross linking member 3 against the impact load can be enhanced.

Figure 8A:
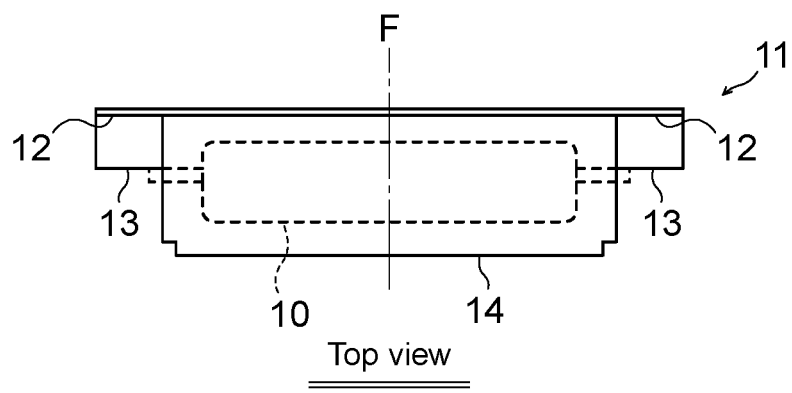
FIG. 8A is a top view of a protecting bracket.
Figure 8B:
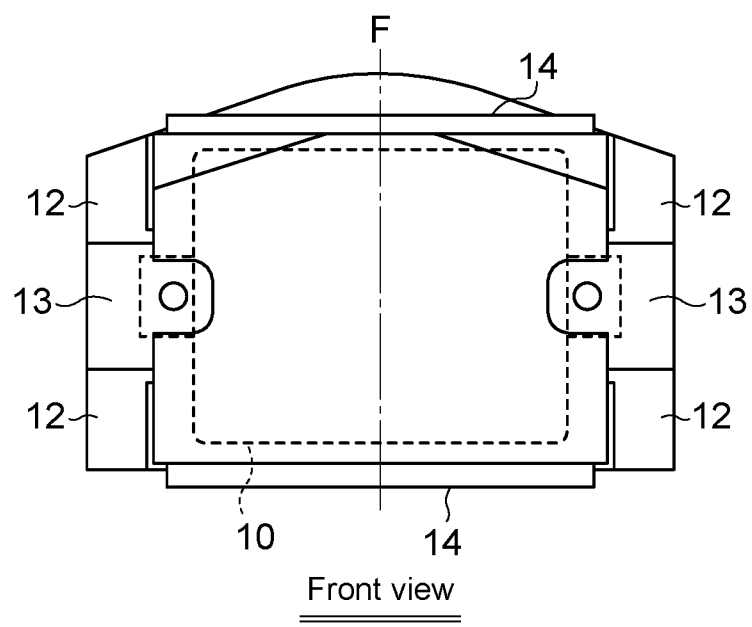
FIG. 8B is a front view of a protecting bracket.

The protecting bracket 11 is formed to be planar symmetric with respect to an imaginary symmetric plane F. The one-dotted line in the top view FIG. 8A and the front view FIG. 8B represents the position of the imaginary symmetric plane F. The imaginary symmetric plane F corresponds to the imaginary symmetric plane D of the EA bracket 4, and the imaginary symmetric plane D and the imaginary symmetric plane F coincides with each other when the EA bracket 4 and the protecting bracket 11 are fixed.

2. Effects and Advantages

Figure 9A:
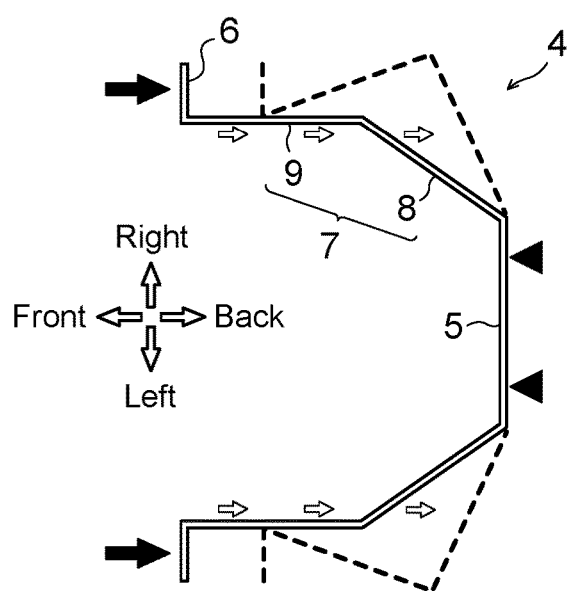
FIGS. 9A and 9B are diagrams illustrating deformed shapes.

When an impact load from the front end of the vehicle acts on the radar device 10, external force is input from the radar device 10 into the EA bracket 4 through the protecting bracket 11. The external force is represented by the black arrows in FIG. 9A, and the internal force (internal stress) in the EA bracket 4 is represented by the white arrows. The vertical face 9 of the EA bracket 4 extends in the same front-to-rear direction as the direction of the external force (i.e., the direction in which the impact load is inputted). For the above, it is estimated that the load becomes large at the initial phase during which the EA bracket 4 deforms to enhance the deceleration effects of an impact target. Since the vector of the internal force coincides with the direction in which the impact target enters, the load that acts on the connection between the vertical face 9 and the inclined face 8 is not distributed very much. Consequently, as illustrated by the broken line of FIG. 9A, it is conceivable that the boundary portion between the vertical face 9 and the inclined face 8 easily bends and deforms, so that the impact load is absorbed.

(1) In the above structure for mounting a radar, the radar device 10 is fixed to the cross linking member 3 via the EA bracket 4. It is conceived that this configuration makes the radar device 10 possible to come closer to the bumper facer 22, so that the detectability of the radar device 10 can be enhanced. It is estimated that providing the deformable parts 7 to the EA bracket 4 can enhance the capability of shock absorbance, so that the protectability for the cross linking member 3 against the impact load can be enhanced. Accordingly, it is estimated that both capability of shock absorbance and detectability can be enhanced. Further, after the collision, it is satisfactorily to replace only the EA bracket 4, so that the maintenance facility of the vehicle can conceivably be enhanced.

(2) In the above structure for mounting a radar, the vertical face 9 is provided to each deformable part 7. With this structure, it is possible to ensure the distance from the cross linking member 3 to the radar device 10, making the radar device 10 possible to be further come closer to the bumper facer 22. Since it is possible to align the direction of the impact load with the direction of transmitting the stress, the load (initial load) at the initial stage of a collision can conceivably be increased, so that the deceleration effect can be enhanced. In contrast, it is estimated that providing the inclined face 8 behind the vertical face 9 can displace the direction in which the external force acts from the direction of transmitting the stress, so that the bend and deformation of the deformable parts 7 can be promoted. Thereby, it is conceivable that the impact load (maximum load) can be reduced, expecting to reduce the injury value in the event of collision with a pedestrian. In addition to the above, it is possible to inhibit the load acting on the connection between the vertical face 9 and inclined face 8 from being distributed, so that it can be estimated that the bend and deformation of the deformable parts 7 can be promoted.

(3) The deformable part 7 is formed by arranging the first deformable portion 7A and the second deformable portion 7B to be planar symmetric to each other. It is estimated that this configuration can suppress the vibration of the EA bracket 4 in the direction along the imaginary symmetric plane D of the first deformable portion 7A and the second deformable portion 7B. Consequently, the state of fixing the EA bracket 4 can be stabilized through the use of the EA bracket 4, so that the detecting precision of the radar device 10 can conceivably be enhanced.

(4) Each of the first deformable portion 7A and the second deformable portion 7B is formed into a bifurcated shape that is planar symmetrical with respect to the imaginary orthogonal plane E to the imaginary symmetric plane D. Thereby, it is conceivable that this configuration can suppress the vibration of the EA bracket 4 in the direction along the imaginary orthogonal plane E. Consequently, the state of fixing the EA bracket 4 can conceivably be stabilized through the use of the EA bracket 4, so that the detecting precision of the radar device 10 can conceivably be enhanced. Placing the two routes of transmission of stress vertically distant from each other can ensure the stiffness to endure the vertical vibration of the vehicle, so that the detecting precision of the radar device 10 can conceivably be further enhanced. In addition, the deformable parts 7 can conceivably be formed to be light in weight.

(5) In the above embodiment, the first deformable portion 7A and the second deformable portion 7B are arranged to oppose each other in the vehicle-width direction. It is conceived that this arrangement can ensure the stiffness to endure the vertical vibration of the vehicle, so that the detecting precision of the radar device 10 can be enhanced. As illustrated in FIG. 3, the EA bracket 4 is arranged so as to spread towards the front when seen from the top. This arrangement can ensure the stiffness to endure the vertical vibration of the vehicle as compared with a structure that the EA bracket 4 is arrange sideways, so that it is estimated that the detecting precision of the radar device 10 can be further enhanced.

(6) The EA bracket 4 is formed so as to have a lower stiffness against external force in the front-to-rear direction of the vehicle than that of the cross linking member 3. In other words, the geometrical moment of inertia of the EA bracket 4 with respect to the axis in the front-to-rear direction of the vehicle is designed so as to be smaller than that of the cross linking member 3. It is estimated that this design can allow the EA bracket 4 to more easily bend and deform than the cross linking member 3. Accordingly, it is possible to abate an input of the impact load into the cross linking member 3, so that the protectability for the cross linking member 3 can conceivably be enhanced.

(7) As illustrated in FIG. 7, the guard parts 14 are provided to the protecting bracket 11 to protect the radar device 10. The presence of the guard parts 14 can prevent load from directly inputting into the radar device 10, so that the protectability for the radar device 10 can conceivably be enhanced.

(8) It is conceived that arranging the guard parts 14 horizontally along the top-edge face and the bottom-edge face of the radar device 10 appropriately protects the top-edge and bottom-edges of the radar device 10 where the impact load is likely input. Accordingly, it is estimated that the protectability for the radar device 10 can be further improved.

Figure 8C:
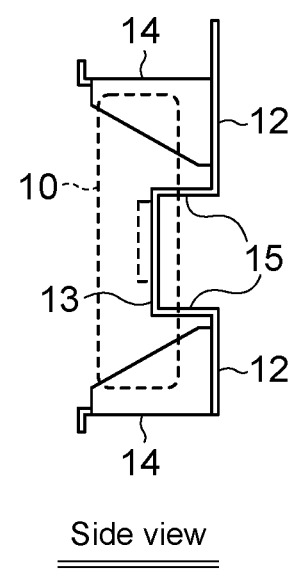
FIG. 8C is a side view of a protecting bracket.

(9) As illustrated in the side view FIG. 8C, the connecting parts 15 extending along the front-to-rear direction of the vehicle are provided between the first mounting parts 12 and the second mounting parts 13. This can form a crank-shaped supporting structure. The positions of the first mounting parts 12 can be easily displaced from those of the second mounting parts 13 in the front-to-rear direction, so that the freedom in layout can be enhanced.

(10) The protecting bracket 11 is formed so as to have a higher stiffness against external force in the front-to-rear direction of the vehicle than that of the EA bracket 4. In other words, the geometrical moment of inertia of the protecting bracket 11 with respect to the axis in the front-to-rear direction of the vehicle is designed so as to be larger than that of the EA bracket 4. This design can allow the EA bracket 4 to more easily bend and deform than the protecting bracket 11.

3. Modification

The foregoing embodiment is exemplary and has no intention to exclude various modifications and applications of techniques not referred in the present embodiment. In other words, various changes and modifications can be suggested without departing from the scope of the present embodiment. The present embodiment and the modifications can be selected, omitted, or combined according to the requirement.

Figure 9B:
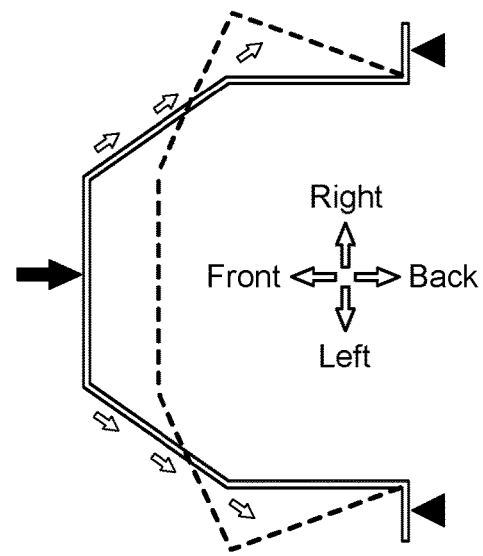
Figure 10A:
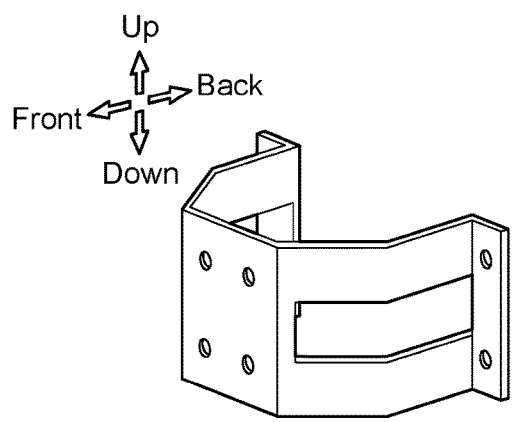
FIGS. 10A-10D are diagrams illustrating modification to a structure for mounting a radar.
Figure 10B:
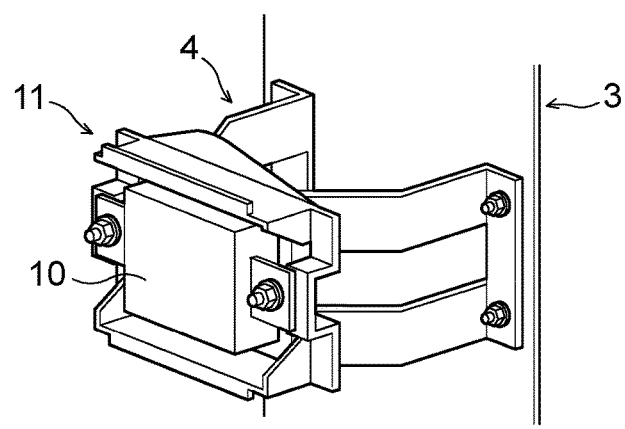

Alternatively, the EA bracket 4 may have an opposite structure in the front-to-rear direction of the vehicle as illustrated in FIGS. 10A and 10B. Also in this case, as shown by the broken line of FIG. 9B, it is estimated that the deformable parts 7 can be bent and deformed at the boundary portion between the vertical face 9 and the inclined face 8, and therefore can absorb the impact load. As compared with the structure of FIG. 9A, since the vector of the internal force is different from the direction in which an impact target is input, the load acting on the connection between the inclined face 8 and the vertical face 9 easily distributed, so that the impact load (maximum load) is slightly increased. However, since the direction in which the internal force (internal stress) acts in the EA bracket 4 is different from the direction in which the external force acts in the EA bracket 4, the load at the initial stage, when the EA bracket 4 deforms, is decreased. Accordingly, the arrangement structure illustrated in FIGS. 10A and 10B can conceivably reduce the injury value in the event of collision with a pedestrian by reducing the initial load.

Figure 10C:
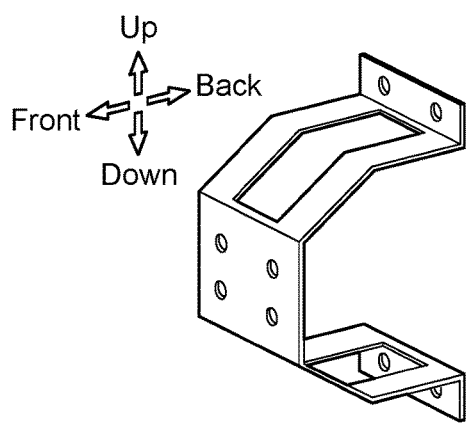
Figure 10D:
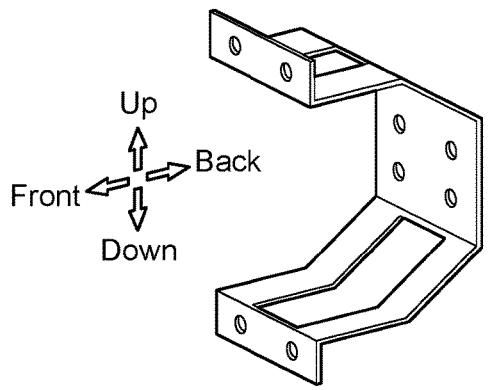

As illustrated in FIGS. 10C and 10D, the EA bracket 4 may be arranged such that the first deformable portion 7A and the second deformable portion 7B vertically oppose each other. In this alternatively, the deformable parts 7 come to be easily displaced and the stiffness against the vibration of the vehicle in the vertical direction lowers slightly. However, the stiffness against the vibration of the vehicle in the vehicle-width direction is increased. Accordingly, it is estimated that the state of fixing the EA bracket 4 can be stabilized in the vehicle-width direction, so that the detecting precision of the radar device 10 can be enhanced.

REFERENCE SIGNS LIST 1 bumper beam (width-across member)
2 upper bar (width-across member)
3 cross linking member
4 EA bracket (fixing member)
5 fixing part
6 supporting part
7 deformable part
7A first deformable portion
7B second deformable portion
8 inclined face
9 vertical face
10 radar device
11 protecting bracket (protecting member)
12 first mounting part
13 second mounting part
14 guard part
15 connecting part
18 heat exchanger
22 bumper facer
D imaginary symmetric plane
E imaginary orthogonal plane
F imaginary symmetric plane The invention thus described, it will be obvious that the same may be modified in many ways. Such variations are not to be regarded as a departure from the spirit and scope of the invention, and all such modifications as would be obvious to one skilled in the art are intended to be included within the scope of the following claims.

What is claimed is:

1. A structure for mounting a radar comprising:
   a cross linking member that vertically connects two width-across members aligned in a front-to-rear direction of a vehicle; and
   a fixing member attached to the cross linking member and extending in a forward direction of a vehicle from the cross linking member, the fixing member including,
   a fixing part fixed to the cross linking member,
   a first deformable portion extending in the forward direction of the vehicle from one edge of the fixing part and having a first front end,
   a second deformable portion extending in the forward direction from another edge of the fixing part and having a second front end spaced apart from the first front end,
   a first supporting part provided at the first front end, and
   a second supporting part provided at the second front end, the first and second deformable portions supporting a radar device,
   wherein the first deformable portion is formed into a shape planar symmetric to the second deformable portion and the first and second deformable portions define an opening at a forward end and configured to bend and deform to absorb shock when an external force is input into the radar device.

2. The structure for mounting a radar according to claim 1, wherein each of the first and second deformable parts includes:
   an inclined face in a shape of a flat face inclined to the fixing part; and
   a vertical face in a shape of a flat face that is inclined to the inclined face and perpendicular to the supporting part.

3. The structure for mounting a radar according to claim 1, wherein each of the first deformable portion and the second deformable portion is formed into a bifurcated shape being planar symmetric with respect to an imaginary orthogonal plane perpendicular to imaginary symmetric plane of the first deformable portion and the second deformable portion.

4. The structure for mounting a radar according to claim 1, wherein the first deformable portion and the second deformable portion oppose each other in a width direction of the vehicle.

5. The structure for mounting a radar according to claim 2, wherein that the first deformable portion and the second deformable portion oppose each other in a width direction of the vehicle.

6. The structure for mounting a radar according to claim 1, wherein the first and second deformable portions have a lower stiffness against external force in the front-to-rear direction of the vehicle than a stiffness of the cross linking member against external force in the front-to-rear direction of the vehicle.

7. The structure for mounting a radar according to claim 1, further comprising:
   a protecting member that comprises:
   a first mounting part to be installed to the supporting part;
   a second mounting part that mounts thereon the radar device; and
   a guard part that protrudes outwards in the front-to-rear direction of the vehicle further than the radar device.

8. The structure for mounting a radar according to claim 7, wherein two of the guard parts are each disposed so as to horizontally extend along one of the top-edge face and the bottom-edge face of the radar device.

9. The structure for mounting a radar according to claim 7, the protecting member comprises a connecting part that connects the first mounting part and the second mounting part in the front-to-rear direction of the vehicle.

10. The structure for mounting a radar according to claim 7, wherein the protecting member has a higher stiffness against external force in the front-to-rear direction of the vehicle than a stiffness against the external force in the front-to-rear of the fixing member.

* * * * *